(12) United States Patent
Blair et al.

(10) Patent No.: US 7,101,306 B2
(45) Date of Patent: Sep. 5, 2006

(54) BI-DIRECTIONAL FOUR-MODE CLUTCH FOR PROVIDING LOW AND REVERSE GEAR RATIOS IN A TRANSMISSION

(75) Inventors: Christopher E. Blair, Waterford, MI (US); John M. Kremer, Sterling Heights, MI (US); R. Keith Martin, Imlay City, MI (US); Melissa Koenig, Howell, MI (US); Brian Stefina, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 155 days.

(21) Appl. No.: 10/627,845

(22) Filed: Apr. 30, 2004

(65) Prior Publication Data

US 2005/0245346 A1    Nov. 3, 2005

(51) Int. Cl.
*F16H 3/44* (2006.01)
*H16D 41/16* (2006.01)

(52) U.S. Cl. ..................... 475/318; 192/43.1
(58) Field of Classification Search ............... 475/282, 475/293, 287, 271, 303, 331, 286, 318; 192/43.1, 192/46, 48.3, 48.92, 47
See application file for complete search history.

(56) References Cited

U.S. PATENT DOCUMENTS

| | | | |
|---|---|---|---|
| 1,831,955 A | 11/1931 | Harney | |
| 2,173,044 A | 9/1939 | Ruggles et al. | 180/44 |
| 2,290,089 A | 7/1942 | Bock | 180/49 |
| 2,551,939 A | 5/1951 | Gerst | 192/48 |
| 2,887,201 A | 5/1959 | Willis | 192/67 |
| 2,906,383 A | 9/1959 | Gabriel | 192/85 |
| 2,969,134 A | 1/1961 | Wiedmann et al. | 192/84 |
| 3,481,436 A | 12/1969 | Wilkowski | 192/35 |
| 3,517,573 A | 6/1970 | Roper | 74/711 |
| 3,631,741 A | 1/1972 | Kelbel | 74/781 |
| 4,114,478 A | 9/1978 | Clauss | 74/781 |

(Continued)

FOREIGN PATENT DOCUMENTS

WO    WO 99/45289    9/1999

*Primary Examiner*—Sherry Estremsky
(74) *Attorney, Agent, or Firm*—Greg Dziegielewski; Bliss McGlynn, P.C.

(57) ABSTRACT

A bi-directional overrunning clutch assembly employed in connection with a reduced capacity low friction clutch to provide low and reverse gears in a transmission. The clutch assembly including an inner race, an outer race, and engagement members supported therebetween. The inner race is operatively coupled to the transmission casing and the outer race is operatively coupled to the ring gear of the gear set as well as the inner race of the friction clutch assembly. The clutch assembly further includes at least one actuating cam. The actuating cam operates to actuate the engagement members to provide four separate modes of operation between the inner and outer races of the clutch assembly. More specifically, the cam is operable to (1) disengage the engagement members to provide freewheeling between the inner and outer races in both rotational directions; (2) to actuate engagement members so that torque is translated in one rotational direction but to allow freewheeling in the opposite rotational direction; (3) to actuate the engagement members so that torque is translated in a direction opposite to that in mode (2) above, but allow freewheeling in the rotational direction opposite to that in which torque is translated in this mode; and (4) to actuate the engagement members so that the inner and outer races are locked relative to each other and torque is translated in both rotational directions.

7 Claims, 3 Drawing Sheets

U.S. PATENT DOCUMENTS

| | | | |
|---|---|---|---|
| 4,407,387 A | 10/1983 | Lindbert | 180/247 |
| 5,152,726 A | 10/1992 | Lederman | 475/324 |
| 5,355,981 A | 10/1994 | Itoh et al. | 192/35 |
| 5,466,195 A | 11/1995 | Nogle et al. | 475/55 |
| 5,584,776 A | 12/1996 | Weilant et al. | 475/213 |
| 5,653,322 A | 8/1997 | Vasa et al. | 192/85 |
| 5,704,867 A | 1/1998 | Bowen | 475/221 |
| 5,806,643 A | 9/1998 | Fitz | 192/45.1 |
| 5,918,715 A | 7/1999 | Ruth et al. | 192/46 |
| 5,992,592 A | 11/1999 | Showalter | 192/43.1 |
| 6,000,510 A | 12/1999 | Kirkwood et al. | 192/3.29 |
| 6,062,361 A | 5/2000 | Showalter | 192/38 |
| 6,109,410 A | 8/2000 | Costin | 192/46 |
| 6,116,024 A | 9/2000 | Rottino | 60/345 |
| 6,149,543 A | 11/2000 | Breen | 475/269 |
| 6,155,395 A | 12/2000 | Braford, Jr. | 192/48.3 |
| 6,186,299 B1 | 2/2001 | Ruth | 192/46 |
| 6,210,300 B1 | 4/2001 | Costin et al. | 475/294 |
| 6,244,407 B1 | 6/2001 | Kremer et al. | 192/70.12 |
| 6,251,045 B1 | 6/2001 | Oliveira et al. | 477/124 |
| 6,814,200 B1 * | 11/2004 | Stefina | 192/43.1 |
| 6,830,531 B1 * | 12/2004 | Koenig et al. | 475/263 |
| 2004/0060794 A1 * | 4/2004 | Li et al. | 192/43.1 |

* cited by examiner

BI-DIRECTIONAL FOUR-MODE CLUTCH FOR PROVIDING LOW AND REVERSE GEAR RATIOS IN A TRANSMISSION

BACKGROUND OF THE INVENTION

1. Field of the Invention

The present invention relates, generally, to bi-directional overrunning clutch assemblies and, more specifically, to an actively controlled, bi-directional, overrunning clutch assembly having four modes of possible operation for use in providing low and reverse gear ratios in a transmission.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets which may include an inner gear, intermediate planet or pinion gears that are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission.

The multi-disc pack clutch or brake assembly has a clutch sub-assembly including a set of plates and a set of friction discs that are interleaved between one another. The plates and friction discs are bathed in a continual flow of lubricant and in "open pack" mode normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission to provide various gear ratios in operation, or to brake a component.

When the discs are not engaged, there often remains a differential rotational speed between the drive and driven members that the clutch or brake bridges. Relative rotation between the friction discs and the plates during open-pack mode creates drag. This condition results in parasitic energy losses, reduces the efficiency of the transmission, and ultimately results in lower fuel efficiency.

In addition to multiple friction devices, one-way clutches are frequently employed in transmissions to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Still, the clutch is necessary for providing the proper holding torque in low and reverse gears. Accordingly, there remains a need in the art for a mechanism that can provide the appropriate holding torque for both low and rear gears in the transmission and yet results in less parasitic losses which are presently attributable to the multiple plate friction clutch used for this purpose. In addition, there is a need in the art for a device that continues to perform the functions of the one-way clutch as described above, particularly where the output speed of the transmission exceeds the input speed resulting in engine compression braking.

Partially in response to this problem, bi-directional overrunning clutches have been proposed in the related art for use in these circumstances. These bi-directional overrunning clutch assemblies typically employ an inner race, an outer race, and a plurality of rollers as the engagement mechanism disposed therebetween. An actuator is employed to bias the rollers in one direction or another to allow freewheeling or torque translation in either rotational direction depending upon the position of the rollers. However, and while they appear to present a solution to certain problems identified above, bi-directional overrunning clutches have not been widely employed in transmissions of the related art. They are relatively mechanically complex and therefore generally more expensive than conventional one-way clutches. In addition, many of the designs considered in the related art simply do not operate at an acceptable level that meets the standards of today's sophisticated driving public.

Accordingly, there remains a need in the art for a bi-directional overrunning clutch assembly that can provide torque translation in either rotational direction as well as one that may be employed to assist a multi-disc friction device to provide low and reverse gear action in a transmission while at the same time reducing parasitic losses attributable to the friction devices known in the related art.

SUMMARY OF THE INVENTION

The disadvantages of the related art are overcome in a bi-directional overrunning clutch assembly employed in connection with a reduced capacity low friction clutch to provide low and reverse gears in a transmission. The automotive transmission assembly has at least one shaft and at least one gear set that is operatively coupled to the shaft to provide low and reverse gear ratios. A transmission casing is employed to support the shaft and the gear set of the transmission assembly. The gear set includes a sun gear operatively coupled to a source of torque in the transmission assembly, a ring gear mounted for rotation about the sun gear and a plurality of pinion gears supported by a carrier for meshing rotation about the sun gear and between the ring gear and the sun gear. The carrier is operatively coupled to the shaft. The transmission assembly also includes a friction clutch assembly including an inner hub that is operatively connected to the ring gear of the gear set. The outer hub of the friction clutch assembly is fixed to the transmission casing. A clutch pack is interposed between the inner hub and the outer hub and is operable to connect the inner and outer hubs together. Furthermore, the transmission assembly includes a bi-directional clutch assembly having an inner race that is operatively coupled to the transmission casing as well as an outer race that is operatively coupled to the ring gear and the inner race of the friction clutch assembly. An engagement mechanism is supported between the inner and outer races of the bi-directional clutch assembly. The engagement mechanism includes a first set of pawls and a second set of pawls that are operatively supported between the inner and outer races. At least one actuating cam is disposed adjacent the inner and outer races of the bi-directional clutch assembly. The actuating cam includes a plurality of disengagement portions as well as a plurality of engagement portions. The engagement and disengagement portions cooperate with the first and second sets of pawls (1) to selectively disengage the first and second sets of pawls to provide freewheeling relative rotation between the inner and outer races; (2) to selectively actuate at least one pawl of the first set of pawls so that torque is translated in a first rotational direction when the transmission assembly is in low gear, but allowing freewheeling relative rotation between the inner and outer races in a second rotational direction that is opposite to the first rotational direction when the transmission assembly is in any higher gear; (3) to selectively actuate at least one pawl of the second set of pawls so that torque is translated in the second rotational direction opposite to the first rotational direction when the transmission assembly is in reverse gear, but allowing freewheeling relative rotation in the first rotational direction when the transmission assembly is in any gear greater than first; and (4) to selectively actuate at least one pawl of the first and second sets of pawls so that torque is translated between the inner and outer races in both of the first and second rotational directions to provide engine breaking.

Thus, one advantage of the bi-directional overrunning clutch assembly of the present invention is that it provides four distinct modes as illustrated in FIGS. 2–5. In this way, the bi-directional overrunning clutch assembly of the present invention may be employed as a component of an automotive driveline in a transmission, to assist a reduced capacity low friction clutch to provide low and reverse gear ratios.

Another advantage of the bi-directional overrunning clutch assembly of the present invention is that when it is used in connection with providing low and reverse gear ratios in the representative transmission illustrated in FIG. 6, a number of friction discs used in the multi-disc friction clutch and a one-way clutch may be eliminated. In this way, the clutch assembly of the present invention reduces parasitic energy loss, improves operational efficiency, and reduces cost.

Another advantage of the bi-directional overrunning clutch of the present invention is that it may be employed in a transmission to take full engine torque in both the low and reverse gear ranges. In addition, the bi-directional overrunning clutch of the present invention provides a freewheel shift from first to second gear.

Still another advantage of the bi-directional overrunning clutch of the present invention is that it may be employed in a transmission to provide the important engine braking effect that can occur when the speed of the transmission output shaft exceeds the speed of the input to any given planetary gear set. In this way, the bi-directional overrunning clutch of the present invention facilitates the use of a reduced capacity low/reverse friction clutch for engine compression braking in low and reverse gear ranges.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 4:
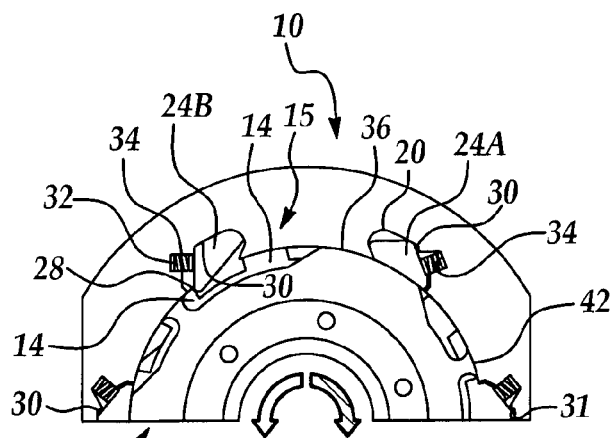
FIG. 4 is an enlarged partial side view of the bi-directional overrunning clutch assembly illustrating a third mode of operation where every other pawl is free to engage to provide torque translation in the opposite rotational direction as illustrated in FIG. 3 but to allow freewheeling movement between the inner race and the outer race in the rotational direction opposite to that in which torque is translated in this mode.
Figure 5:
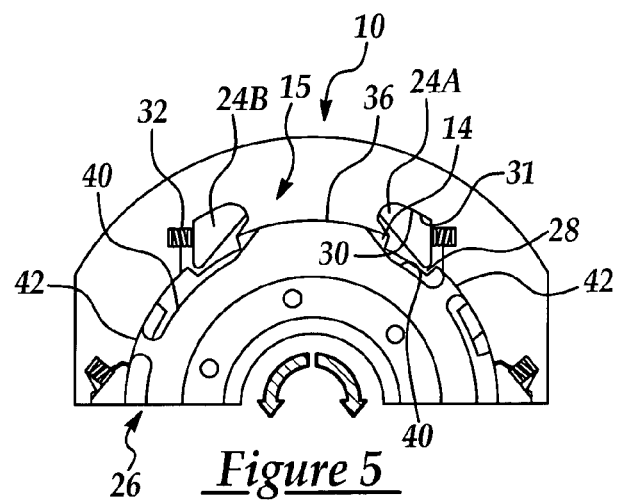
FIG. 5 is an enlarged partial side view of the bi-directional overrunning clutch assembly illustrating a fourth mode of operation wherein both sets of pawls are free to engage so that the inner and outer races are locked relative to each other and torque is translated in both rotational directions.
Figure 7:
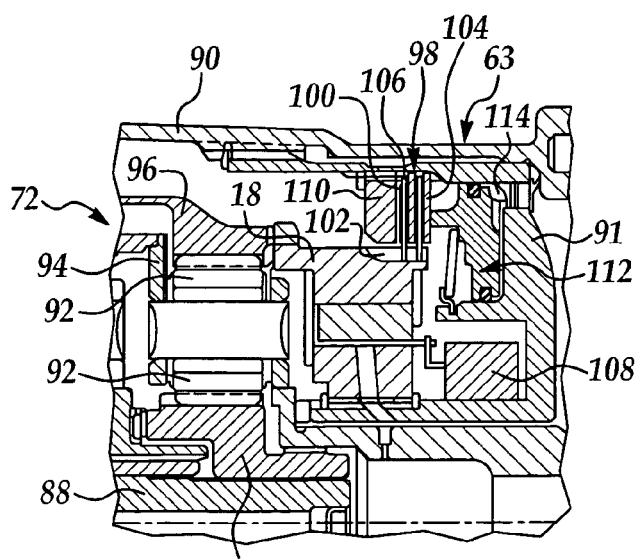
FIG. 7 is a schematic representation of the bi-directional overrunning clutch assembly employed in conjunction with a reduced capacity low friction clutch and a planetary gear set to provide low and reverse gear ratios in the transmission of FIG. 6.
Figure 6:
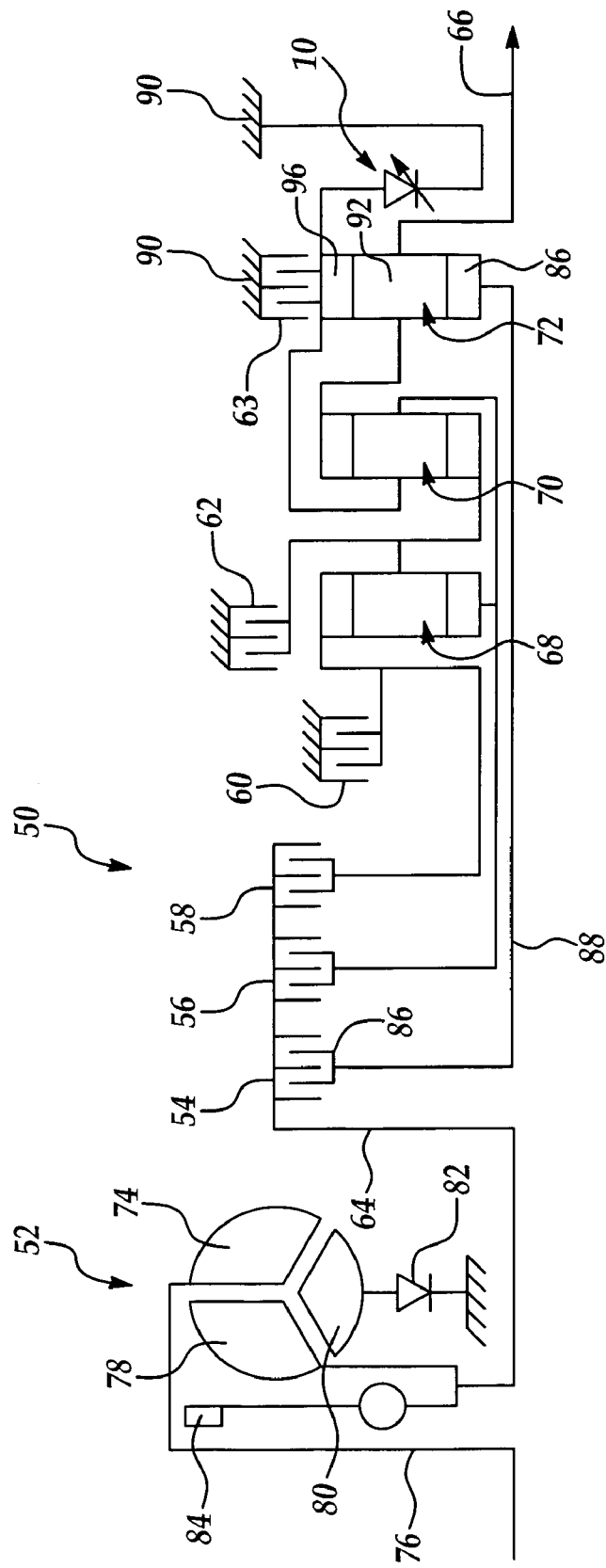
FIG. 6 is a schematic diagram depicting a transmission illustrating one possible use of the bi-directional overrunning clutch assembly in connection with a reduced capacity low friction clutch to provide low and reverse gear ratios.

The bi-directional overrunning clutch assembly of the present invention is generally indicated at 10 in FIGS. 1–5, where like numerals are used to designate like structure throughout the drawings. The various subcomponents of the clutch assembly 10 are illustrated in the exploded view of FIG. 1 and the four operational modes are illustrated in the partial side views of FIGS. 2–5. The clutch assembly 10 is particularly adapted for use as a component of drivelines of land-based vehicles, such as in transmissions, transfer cases, differentials and the like. Accordingly, one application for the clutch assembly 10 of the present invention is shown in connection with a transmission which is schematically illustrated in FIGS. 6 and 7. However, those having ordinary skill in the art will appreciate that the clutch assembly of the present invention may be employed in numerous applications, whether or not the application takes advantage of all four operational modes of the clutch assembly as discussed below.

Figure 1:
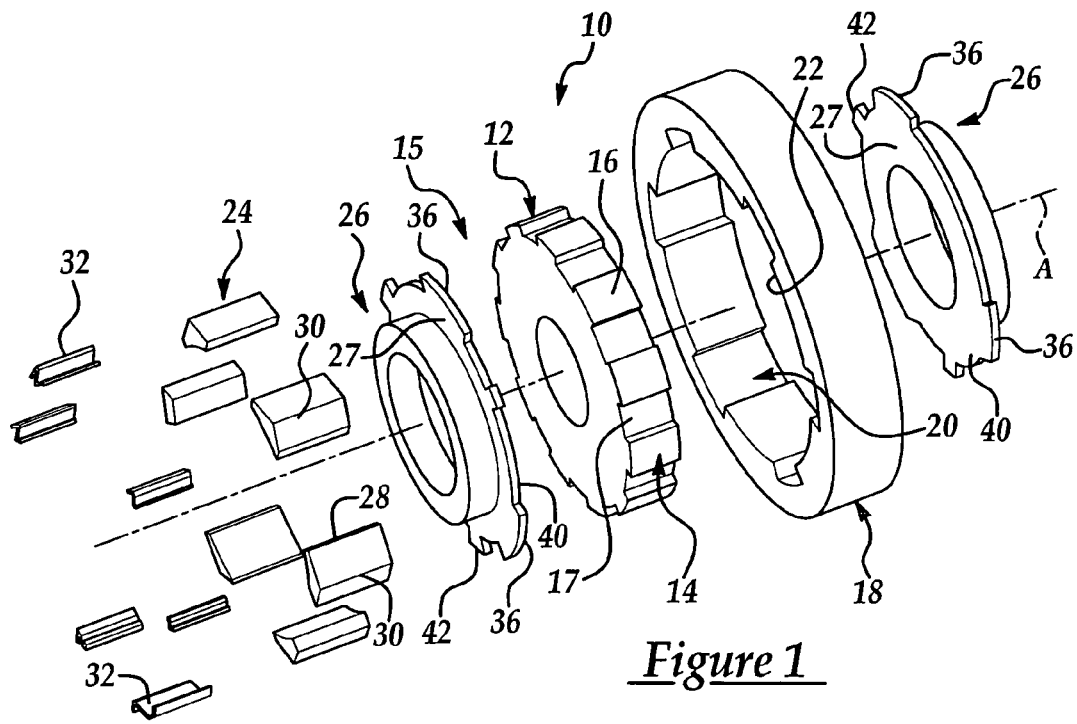
FIG. 1 is an exploded view of the bi-directional overrunning clutch assembly of the present invention.

Referring now to FIG. 1, the clutch assembly 10 of the present invention includes an inner race, generally indicated at 12, an outer race, generally indicated at 18, and an engagement mechanism, generally indicated at 15, that is supported between the inner and outer races. The engagement mechanism 15 includes a plurality of pockets, generally indicated at 20 and a corresponding plurality of pawls, generally indicated at 24. In addition, the engagement mechanism includes a plurality of teeth, generally indicated at 14. In the preferred embodiment illustrated in figures, the teeth 14 are formed on the outer circumference 16 of the inner race. Roots 17 are defined between adjacent teeth 14. On the other hand, the plurality of pockets 20 are formed on the inner circumference 22 of the outer race. However, those having ordinary skill in the art will appreciate from the description that follows that the teeth may be formed on the outer race and the pockets may be formed on the inner race without departing from the scope of the present invention.

As noted above, the clutch assembly 10 is bi-directional. Thus, with reference to FIGS. 2–5, the plurality of pockets 20 will include first and second sets of pockets 20A and 20B. Each pocket in a given set is located adjacent to a pocket from the other set. Furthermore, each pocket in the first set is oriented in an opposite direction relative to an adjacent pocket of the second set about the inner circumference of the outer race. Similarly, the plurality of pawls 24 include first and second sets of pawls 24A and 24B. The two sets of pawls 24A and 24B correspond to the two sets of pockets 20A and 20B. Each of the pawls 24 is moveably supported in a corresponding set of pockets 20 such that each pawl from the first set 24A is adjacent to a pawl from the second set 24B. In addition, each pawl 24A in the first set is oriented in an opposite direction relative to an adjacent pawl 24B from the second set. Thus, the clutch assembly 10 of the present invention includes essentially two sets of pawls 24 that are oriented in opposite directions. The first set of pawls 24A acts to translate torque between the inner and outer races in one rotational direction. This occurs when at least one pawl 24A of the first set of pawls is disposed in its engaged position. The second set of pawls 24A acts to translate torque between the inner and outer races in the opposite rotational direction when at least one pawl 24B the second set of pawls is disposed in its engaged position. The first set of pawls 24A may be designated as forward pawls. Engagement of one of the opposing, or second set of pawls 24B will allow for reverse movement and may therefore be designated as the reverse pawls. It should be appreciated that the designating of one of the two sets of pawls 24 as "first" or "forward" and the other set as "second" or "reverse" is merely a relative designation dependant on the application in which the clutch is employed (e.g. transmission or transfer case) and may relate to the relative rotational direction that achieves either a forward or reverse movement of the vehicle. Those having ordinary skill in the art will appreciate from the description that follows that the two sets of pawls 24A and 24B are identical and are supported about the inner diameter of the outer race so that adjacent pawls are opposed to one another to achieve the bi-directional function of the clutch. The specific structure of the pawls and pockets as well as the interaction of the engagement mechanism between the inner and outer races that provides this functionality will be discussed in greater detail below.

While the pawls may have any suitable geometric shape, as illustrated, for example, in FIGS. 2–5, the pawls 24 have a generally triangular shape when viewed from the side. As noted above, the pawls 24 are received in the pockets 20 formed in the inner diameter 22 of the outer race 18 and are supported in circumferentially spaced orientation about the rotational axis A of the clutch assembly 10. In addition, as best shown in FIG. 1, each pawl 24 defines a longitudinal axis that extends in the direction of the rotational axis A. Each pawl 24 has a nose portion 28 and a fulcrum portion 30 formed thereon. The fulcrum portion 30 is adapted to provide pivoting motion relative to a corresponding surface 31 defined by the pocket 20. A biasing member 32 is also captured in a special axially extending recess 34 formed in each pocket 20. The biasing member 32 provides a biasing force between the outer race 18 and the pawl 24 to bias the nose portion 28 of the pawl 24 into engagement with a torque-translating tooth 14 formed on the outer diameter 16 of the inner race 12. In the preferred embodiment, the biasing member is a Z-shaped spring having a longitudinal axis which corresponds to the longitudinal axis of the associated pawl 24 and is disposed within the special recess 34 so as to be substantially parallel with the rotational axis A of the clutch assembly 10. However, those having ordinary skill in the art will appreciate that any number of biasing members known in the related art may be suitable for this purpose. Thus, within the context of this description of the preferred embodiment of the present invention, those having ordinary skill in the art will appreciate that the present invention is not limited in any way to the specific Z-shaped biasing member 32 illustrated and described herein.

As noted above, adjacent pawls 24 are oriented in opposite directions. Thus, each adjacent pawl 24 is supported by its associated pocket 20 such that the nose portion 28 of each adjacent pawl 24 is pointed, generally, in the opposite direction. More specifically, every other pawl 24 is disposed to selectively provide torque translation in opposite rotational directions as will be described in greater detail with respect to FIGS. 2–5.

Figure 2:
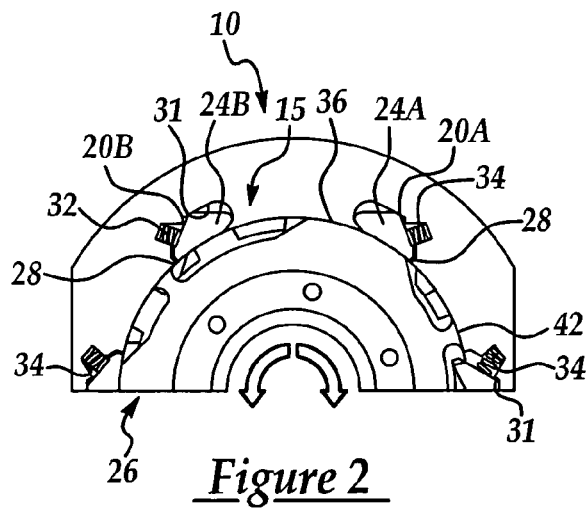
FIG. 2 is an enlarged partial side view of the bi-directional overrunning clutch assembly illustrating one mode of operation where both sets of pawls are disengaged such that the clutch may freewheel in both directions.
Figure 3:
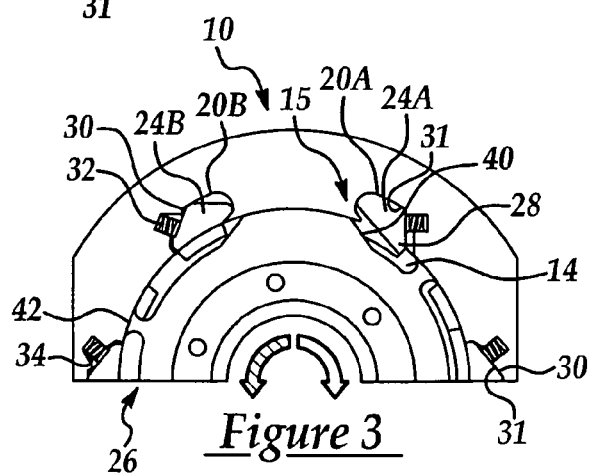
FIG. 3 is an enlarged partial side view of the bi-directional overrunning clutch assembly illustrating another mode of operation where every other pawl is free to engage so as to provide torque translation in one direction but allow freewheeling movement in the opposite rotational direction.

The clutch assembly 10 further includes at least one actuating cam, generally indicated at 26. The actuating cam 26 is operatively disposed relative to the inner and outer races 12, 18 to actuate the engagement mechanism 15 to provide four separate modes of operation between the inner and outer races 12, 18 of the clutch assembly 10. More specifically, and referring now to FIGS. 2–5, the cam is operable to (1) disengage the pawls 24 to provide freewheeling between the inner and outer races 12, 18 in both rotational directions as shown in FIG. 2; (2) to actuate the pawls 24 so that torque is translated in one rotational direction but to allow freewheeling in the opposite rotational direction as shown in FIG. 3; (3) to actuate the pawls 24 so that torque is translated in a direction opposite to that in mode (2) above, but allow freewheeling in the rotational direction opposite to that in which torque is translated in this mode (FIG. 4); and (4) to actuate the pawls 24 so that the inner and outer races 12, 18 are locked relative to each other and torque is translated in both rotational directions (FIG. 5).

Preferably, the clutch assembly 10 includes a pair of actuating cams 26 as best shown in FIG. 1. The cams 26 may be disposed on either side of the inner and outer races 12, 18 or they may be nested with respect to each other and located on one side or the other of the clutch assembly. As noted above, each of the cams 26 may be selectively indexed to bring one or more pawls from one set of pawls 24 into an engaged or disengaged position. To this end, each actuating cam 26 includes a flat disc portion 27 having a plurality of disengagement portions 36 spaced about the outer periphery of the flat disc portion 27. The disengagement portions 36 are adapted to disengage every other pawl 24. More specifically, the disengagement portions 36 formed on one of the actuating cams define a first set of disengaging portions that cooperate with the first set of pawls 24A to move the first set of pawls 24A out of engagement between the inner and outer races of the clutch assembly. Similarly, the other actuating cam 26 includes a second set of disengagement portions that cooperate with the second set of pawls 24B to move the second set of pawls out engagement between the inner and outer races. Thus, when both actuating cams 26 are disposed in this orientation, they support each pawl 24 so that the pawls 24 cannot engage the teeth 14 formed on the outer diameter 16 of the inner race 12. In this disposition, the clutch assembly 10 may freewheel in either rotational direction as illustrated, for example in FIG. 2.

In addition, the actuating cams 26 includes a plurality of engagement portions that are defined by sloping portions 40. More specifically, the plurality of engagement portions include a first set of sloping portions 40 that cooperate with the first set of pawls 24A to move at least one of the pawls of the first set into an engaged position so that torque is translated in the first rotational direction. Similarly, the plurality of engagement portions include a second set of sloping portions 40 formed on the other actuating cam 26 that cooperate with the second set of pawls 24B to move at least one of the pawls of the second set of pawls 24B into an engaged position so that torque is translated in a second rotational direction that is opposite from the first. In the embodiment illustrated here, each disengaged portion 36 is formed between adjacent sloping portions 40 on each assembly cam 26. Thus, when a given cam 26 is oriented such that the sloping portion 40 is disposed opposite a pawl 24, the biasing member 32 acts to move the nose portion 28 of the pawl 24 in the direction of the outer diameter 16 of the inner race 12 and into engagement with one of the teeth 14 formed thereon. In this operative mode, torque is translated between the inner and outer races 12, 18 in one rotational direction or the other as illustrated in FIGS. 3 and 4. When the other cam 26 is actuated so that its disengagement portions 36 are disposed opposite the respective pawls 24, the clutch assembly 10 will freewheel in the opposite rotational direction as illustrated in FIGS. 3 and 4. On the other hand, when a sloping portion 40 of both actuating cams 26 is disposed opposite a corresponding pawl 24, the nose portion 28 of that pawl 24 is biased into engagement with a corresponding tooth 14 formed on the outer diameter 16 of the inner race 12. When at least one of the pawls from both sets of pawls 24 are engaged in this manner, the inner and outer races 12, 18 are locked together and torque is translated in both rotational directions as illustrated in FIG. 5.

Each actuating cam 26 includes a plurality of outer rotational guides 42 located between adjacent sloping portions 40. The outer rotational guides 42 engage the inner radius 22 of the outer race 18 and thereby provide concentric stability of the actuating cam 26 relative to the outer race 18.

As will be clear from the discussion that follows, the bi-directional overrunning clutch assembly 10 of the present invention may be employed in any number of applications to provide one or more of the four operational modes described above. For example, the clutch assembly 10 may be employed in conjunction with a reduced capacity low friction clutch thereby eliminating a number of discs used in the clutch to provide low and reverse gears in transmissions. In this way, the clutch assembly may result in a reduction of parasitic energy losses that are associated with the use of multi-plate friction disc clutches. When used in this way, the clutch assembly 10 thereby results in reduced weight and a concomitant reduction in cost in the associated driveline component.

One representative example of an advantageous use of the bi-directional overrunning clutch assembly of the present invention is shown in connection with a transmission, schematically illustrated at 50 in FIG. 6. The transmission 50 has a number of conventional components that are arranged to translate torque between a prime mover, such as an internal combustion engine (not shown) and the output of the transmission at various gear ratios. However, those having ordinary skill in the art will appreciate that the standard components of a transmission may be arranged in numerous ways to provide various gear ratios. Thus, the exact configuration of these components form no part of the present invention and are only discussed to better illustrate the salient features of the bi-directional overrunning clutch assembly 10 of the present invention.

To this end, the transmission 50 includes a torque converter, generally indicated at 52, and a plurality of multi-plate friction disc clutches 54, 56, 58, 60, 62, 63 or similar mechanisms that serve as holding mechanisms or brakes to translate torque between the primary transmission input shaft 64 and the primary transmission output shaft 66 acting through a plurality of planetary gear sets 68, 70, and 72, as is commonly known in the art. The torque converter 52 includes an impeller assembly 74 operatively connected for rotation with the torque input member 76 from the internal combustion engine. A turbine assembly 78 is fluidly connected in driven relationship with the impeller assembly 74. The torque converter 52 also includes a stator assembly 80. These assemblies together form a substantially toroidal flow passage for kinetic fluid in the torque converter 52. Each assembly includes a plurality of blades or vanes that act to convert mechanical energy into hydrokinetic energy and back to mechanical energy. The stator assembly 80 of a conventional torque converter is locked against rotation in one direction but is free to spin about an axis in the direction of rotation of the impeller assembly 74 and the turbine assembly 78. A one-way clutch 82 is often employed for this purpose. When the stator assembly 80 is locked against rotation, the torque is multiplied by the torque converter. During torque multiplication, the output torque is greater than the input torque for the torque converter 52. In addition, conventional torque converters often employ clutches 84 interposed between the torque input member 76 and the turbine assembly 78 which are engaged and "lock up" at higher speed ratios (speed output over speed input). When the clutch 84 is locked up, there is a direct torque translation between the torque input member 76 and the transmission 50 through the turbine assembly 78.

In the particular transmission 50 illustrated in FIG. 6, an underdrive clutch 54, overdrive clutch 56, reverse clutch 58, fourth gear brake 60, second gear brake 62 and a low/reverse gear brake 63 are employed as holding mechanisms to translate torque from the primary transmission input shaft 64 to various ones of the planetary gear sets 68, 70, and 72, as the case may be. In turn, each of the planetary gear sets include a sun gear operatively coupled to one of the clutches identified above, a ring gear disposed about the respective sun gear, and a plurality of pinion or planetary gears disposed in meshing relationship between the respective sun and ring gears.

In the representative embodiment illustrated herein, the bi-directional overrunning clutch assembly 10 is employed in connection with the planetary gear set 72 and the low/reverse gear brake 63 which together provide low and reverse gear ratios. This application is schematically illustrated in FIG. 7. In this case, torque is provided from the underdrive clutch 54 to the sun gear 86 that is splined to the shaft 88. For a low gear, such as first gear, the actuation cam 26 is indexed such that the bi-directional overrunning clutch assembly 10 is operating in the mode illustrated in FIG. 3. In this application, the outer race 18 is grounded to the transmission case 90 through the low/reverse gear brake 63. To this end, the low/reverse gear brake 63 includes an annular clutch pack, generally indicated at 98, one half of which is illustrated in FIG. 7. The clutch pack 98 is interposed between the outer race 18 and the transmission case 90 through a clutch housing 91. Thus, the clutch pack 98 operates to connect and disconnect the outer race 18 of the clutch assembly 10 and the transmission case 90 for translating and interrupting torque therebetween. The clutch pack 98 includes a reduced number of annular plates 100 splined at 102 to the outer race 18. A plurality of annular friction discs 104 are splined at 106 to the friction clutch housing 91 and interleaved between the plates 100. The plates 100 and friction discs 104 are also axially movable relative to their respective spline, outer race, and clutch housing to come into frictional engagement, thereby reducing or eliminating relative rotation between the plates 100 and discs 104. A pair of retaining rings are typically mounted to the clutch housing 91 and are disposed on either side of the clutch pack 98. A pressure plate 110 may also be employed to cooperate with the retaining ring to limit axial movement of the plates 100 and friction discs 104.

Axial movement of the adjacent plates and friction discs is achieved through the actuation of a piston assembly, generally indicated at 112, which is supported in the clutch housing 91. The piston assembly 112 and the clutch housing 91 cooperate to define an expandable chamber 114 between the piston assembly 112 and the clutch housing 91. A source of pressurized fluid is in communication with the expandable chamber 114 via any suitable means. The piston assembly 112 is responsive to the pressure of fluid in the expandable chamber 114 to move between disengaged and engaged positions thereby actuating the clutch pack 98 to connect and disconnect the outer race 18 of the clutch assembly 10 with the transmission case 90 via the clutch housing 91. The outer race 18 is also operatively connected to the ring gear 96.

In low gears, the brake 63 is engaged and input torque is thus geared down through the pinion gears 92 supported on the carrier 94 and from the carrier 94 to the transmission output shaft 66. In this way, a low gear ratio is effected at the output shaft 66 of the transmission 50. On the other hand, when the brake 63 is released, the clutch 10 is capable of freewheeling in the opposite rotational direction. Thus, the bi-directional overrunning clutch of the present invention provides a freewheel shift from first to second gear. Parasitic losses and the resultant reduction in fuel efficiency due to the multi-disc friction clutch are concomitantly reduced because the clutch assembly 10 assists in carrying the load that previously was carried by a larger multi-disc friction clutch.

In addition to reducing parasitic losses, the bi-directional overrunning clutch assembly employed in connection with low and reverse gears also provides an important engine braking function. This may occur, for example, in manual first gear when the pawls 24 are engaged in the forward position as illustrated in FIG. 3 and the operator has his foot in the throttle of the internal combustion engine. In this operative mode, torque is translated from the inner race 12 to the transmission case 90. However, in a "lift foot" condition, the inner race shifts 12 and the reverse pawls 24 are engaged. In this operative mode, the wheels of the automobile drive through the transmission providing torque to the engine. The engine thus acts as a brake on the vehicle.

Alternatively, the Low/Reverse brake 63 can be engaged and used to provide engine compression braking during "lift foot" maneuvers.

When reverse gear is selected, the reverse clutch 58 is engaged and torque is translated to the ring gear 96 of the gear set 72 through the gear sets 68 and 70. In addition, the actuation cam 26 is indexed to the mode illustrated in FIG. 4 via an electromagnetic actuator schematically illustrated at 108 in FIG. 7. In this operational mode, the clutch 10 translates torque in a direction opposite to that illustrated in FIG. 3, but allows freewheeling in the rotational direction opposite to that in which torque is translated in this mode (counterclockwise as illustrated in FIG. 4).

Alternatively, in reverse gear, the bi-directional overrunning clutch 10 may be operated in the mode illustrated in FIG. 5 wherein both sets of pawls 24 are locked to provide torque translation in either direction. In this operative mode, the friction disc brake 63 is also actuated as a holding mechanism to assist in carrying the load that was previously carried by a larger multi-disc friction clutch in known transmissions of the related art. Engine braking as described above may also be effected in reverse gear when the bi-directional overrunning clutch is operated in the mode illustrated in FIG. 5. In the remaining gears 2–4 of the transmission illustrated in FIG. 6, both of the actuation cams 26 are indexed to disengage both sets of pawls 24 so that the clutch 10 freewheels in both rotational directions.

Thus, in one representative example, the bi-directional overrunning clutch assembly 10 facilitates the reduction in size of the multi-disc friction device used as the low/reverse gear clutch and eliminates the need for the one-way clutch typically associated with low and reverse gears thereby reducing the parasitic losses associated with the friction clutch. Thus, the bi-directional overrunning clutch assembly provides a freewheel shift from first to second gear. In addition, the clutch of the present invention is designed to take full engine torque in both low and reverse gear ranges. Furthermore, the bi-directional overrunning clutch 10 still provides the important engine braking effect that can occur when the speed of the transmission output shaft exceeds the speed of the input to the planetary gear set 72 as illustrated in the representative transmission 50 of FIG. 6. In this way, the bi-directional overrunning clutch assembly of the present invention facilitates the use of a reduced capacity low/reverse friction clutch that may be employed primarily for engine compression braking in low and reverse gear ranges.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. An automotive transmission assembly having at least one shaft and at least one gear set operatively coupled to said shaft to provide low and reverse gear ratios, said transmission assembly comprising:

a transmission casing for supporting the shaft and the gear set of said transmission assembly;

said gear set including a sun gear operatively coupled to a source of torque in said transmission assembly, a ring gear mounted for rotation about said sun gear and a plurality of pinion gears supported by a carrier for meshing rotation about said sun gear and between said ring gear and said sun gear, said carrier operatively coupled to said shaft;

a friction clutch assembly including an inner hub operatively connected to said ring gear of said gear set, an outer hub fixed to said transmission casing and a clutch pack interposed between said inner hub and said outer hub and operable to connect said inner and outer hubs together;

a bi-directional clutch assembly having an inner race operatively coupled to said transmission casing, an outer race operatively coupled to said ring gear and said inner hub of said friction clutch assembly and an engagement mechanism supported between said inner and outer races of said bi-directional clutch assembly, said engagement mechanism including a first set of pawls and a second set of pawls operatively supported between said inner and outer races;

at least one actuating cam disposed adjacent said inner and outer races and including a plurality of disengagement portions and a plurality of engagement portions, said engagement and disengagement portions cooperating with said first and second sets of pawls to selectively disengage said first and second sets of pawls to provide freewheeling relative rotation between said inner and outer races; to selectively actuate at least one pawl of said first set of pawls so that torque is translated in a first rotational direction when said transmission assembly is in low gear but allowing freewheeling relative rotation between said inner and outer races in a second rotational direction that is opposite to said first rotational direction when said transmission assembly is in any higher gear; to selectively actuate at least one pawl of said second set of pawls so that torque is translated in said second rotational direction opposite to said first rotational direction when said transmission assembly is in reverse gear but allowing freewheeling relative rotation in said first rotational direction when said transmission assembly is in any gear greater than first; and to selectively actuate at least one pawl of said first and second sets of pawls so that torque is translated between said inner and outer races in both of said first and second rotational directions to provide engine breaking.

2. An automotive transmission assembly as set forth in claim 1 wherein said assembly includes a pair of actuating cams, each of said pair of actuating cams associated with one of said first and second sets of pawls, each one of said pair of actuating cams including a flat disc portion having a plurality of disengagement portions spaced about the outer periphery of said flat disc portion and operable to move said pawls out of engagement between said inner and outer races and a plurality of engagement portions spaced about the outer periphery of said flat disc portion and operable to move said pawls into engagement between said inner and outer races.

3. An automotive transmission assembly as set forth in claim 2 wherein said pair of actuating cams are supported for incremental, coaxial rotational movement on opposite sides of said inner and outer races.

4. An automotive transmission assembly as set forth in claim 1 wherein said engagement mechanism includes a plurality of pockets formed on the inner circumference of said outer race and a plurality of teeth formed on the outer circumference of said inner race.

5. An automotive transmission assembly as set forth in claim 4 wherein said plurality of pockets includes first and second sets of pockets that correspond to said first and second set of pawls and wherein each pocket in said first set is located adjacent to a pocket from said second set and each pocket in said first set is oriented in an opposite direction relative to an adjacent pocket of said second set about the inner circumference of said outer race.

6. An automotive transmission assembly as set forth in claim 5 wherein each pawl of said first and second sets of pawls is moveably supported in a corresponding one of said first and second set of pockets such that each pawl of said first set is adjacent to a pawl from said second set of pawls and such that each pawl in set first set is oriented in an opposite direction relative to an adjacent pawl from said second set of pawls and wherein said first set of pawls acts to translate torque between said inner and outer races in said first rotational direction when at least one pawl from said first set of pawls is disposed in its engaged position and said second set of pawls act to translate torque between said inner and outer races in said second rotational direction that is opposite to said first rotational direction when at least one of pawl of said first set of pawls is disposed in its engaged position.

7. An automotive transmission assembly as set forth in claim 1 wherein said shaft is operatively connected to the output of said transmission assembly and said carrier is operatively connected to at lease one other gear set of said transmission assembly.

\* \* \* \* \*